United States Patent [19]

Mitcheson

[11] Patent Number: 5,434,381
[45] Date of Patent: Jul. 18, 1995

[54] APPARATUS FOR FILTERING MACHINING LIQUID OF AN ELECTRICAL DISCHARGE MACHINE

[75] Inventor: George R. Mitcheson, Arlington Heights, Ill.

[73] Assignee: T-Star Industrial Electronics, Inc., Wheeling, Ill.

[21] Appl. No.: 120,246

[22] Filed: Sep. 13, 1993

[51] Int. Cl.⁶ ............................................. B23H 1/10
[52] U.S. Cl. ............................... 219/69.14; 210/195.2
[58] Field of Search ................ 219/69.14; 210/323.2, 210/333.01, 332, 335, 340, 321.88, 416.1, 167, 257.1, 257.2, 258, 521, 259, 195.1, 195.2

[56] References Cited

U.S. PATENT DOCUMENTS

| | | |
|---|---|---|
| 2,868,382 | 1/1959 | Best . |
| 3,239,438 | 3/1966 | Voorhees .................. 219/69.14 |
| 3,455,457 | 7/1969 | Popelar . |
| 3,469,057 | 9/1969 | Maines ..................... 219/69.14 |
| 3,477,948 | 11/1969 | Inoue . |
| 3,678,240 | 7/1972 | Dietrick . |
| 3,915,857 | 10/1975 | Olson ........................ 210/257.1 |
| 3,962,081 | 6/1976 | Yarwood et al. . |
| 4,255,255 | 3/1981 | Ogawa et al. ................. 210/335 |
| 4,260,496 | 4/1981 | Beer ........................... 210/323.2 |
| 4,278,544 | 7/1981 | Takashima . |
| 4,361,485 | 11/1982 | Boonstra ..................... 210/195.2 |
| 4,518,501 | 5/1985 | Lennartz et al. . |
| 4,551,602 | 11/1985 | Inoue et al. . |
| 4,562,021 | 12/1985 | Alary et al. . |
| 4,584,450 | 4/1986 | Inoue . |
| 4,587,016 | 5/1986 | Sumiyoshi . |
| 4,591,383 | 5/1986 | McGarry et al. . |
| 4,626,332 | 12/1986 | Inoue . |
| 4,629,483 | 12/1986 | Stanton . |
| 4,719,058 | 1/1988 | Komoda . |
| 4,746,341 | 5/1988 | Komoda . |
| 4,839,488 | 6/1989 | Katoh et al. . |
| 4,857,688 | 8/1989 | Aso et al. . |
| 4,859,324 | 8/1989 | Levy et al. .................. 210/195.2 |
| 4,957,625 | 9/1990 | Katoh et al. ................. 210/323.2 |
| 4,992,641 | 2/1991 | Budin et al. ................. 210/195.2 |
| 5,074,999 | 12/1991 | Drori ......................... 210/333.01 |
| 5,189,276 | 2/1993 | Magara ....................... 219/69.14 |
| 5,221,467 | 6/1993 | Suzuki et al. ................ 219/69.14 |

FOREIGN PATENT DOCUMENTS

| | | |
|---|---|---|
| 1196873 | 11/1985 | Canada . |
| 2553099 | 7/1976 | Germany . |
| 158463 | 1/1983 | Germany . |
| 87056798 | 7/1987 | Germany . |
| 3828236 | 1/1990 | Germany . |
| 3828237 | 1/1990 | Germany . |
| 3828238 | 2/1990 | Germany . |
| 60-135128 | 7/1985 | Japan . |
| 2154892 | 9/1985 | United Kingdom . |

OTHER PUBLICATIONS

"Microfiltration tangentielle avee decolmatage sur membranes ceramiques" 1984 (German).
"New Ceramic Filter Media For Cross-Flow Microfiltration And Ultrafiltration", Apr. 1986.
"Liquid Filtration and Separation with Inorganic Membranes: Operating Considerations and some Aspects of System Design", pp. 129–131, Dec. 1991.
"CFCC Cross-Flow Microfiltration Modules", technical specifications by Le Carbone–Lorraine, No Publication Date.
"Inorganic Membranes: Synthesis and Applications", pp. 6–7, 1991.

*Primary Examiner*—Geoffrey S. Evans
*Attorney, Agent, or Firm*—George Pappas

[57] ABSTRACT

An apparatus for filtering machining liquid of an electrical discharge machine. The apparatus includes a plurality of cross flow filters placed in series with one another and with a pump drawing dirty liquid from a capacity tank. The permeate from the cross flow filters is provided to the electrical discharge machine. The permeate outlets of the cross flow filters are provided with valves that are selectively opened only upon demand for machining liquid by the electrical discharge machine. The permeate valve of the cross flow filter having the smallest cross member pressure is opened prior to opening other permeate valves. A capacity tank includes a baffled area and sludge accumulating within the capacity tank is drawn from the baffled area to paper filters. The cross flow filters are back flushed on a timed interval and the particulates dislodged during back flushing are dumped into the baffled area of the capacity tank.

30 Claims, 1 Drawing Sheet

APPARATUS FOR FILTERING MACHINING LIQUID OF AN ELECTRICAL DISCHARGE MACHINE

TECHNICAL FIELD

The present invention relates to an apparatus for filtering a machining liquid of an electrical discharge machine using a cross flow type filter.

BACKGROUND OF THE INVENTION

Electrical discharge machines are presently widely used for cutting and shaping many different electrically conductive materials or workpieces. These machines remove material from a workpiece by spark erosion as an electrode or a moving wire electrode is placed near the workpiece. Typically, the workpiece and the electrode are placed at different electrical potentials for causing the necessary spark therebetween and, also, causing the electroerosion. Many sparks are rapidly provided between the electrode and the workpiece thereby creating the cutting action.

A dielectric machining liquid such as oil or de-ionized water is typically provided for cooling the cutting area of the workpiece and electrode and to carry away the very small pieces of the workpiece created by the cutting action. If these particles are not properly carried away from the cutting area, the sparks occurring between the workpiece and the electrode cannot accurately be controlled and, as a consequence, accuracy is significantly diminished. Accordingly, a continuous supply of clean machining liquid is required during the machining process.

In the past, the machining liquid has been filtered using filter elements, for example, incorporating filter paper. However, these filters quickly clog causing substantial down time for removing and replacing the paper filters. They are also ineffective at removing micron size particulates because their pores are often larger than the particulates created by the electrical discharge machining.

More recently, ceramic cross flow filters have been used for filtering machining liquid of electrical discharge machines. Examples of such uses are disclosed in U.S. Pat. No. 4,839,488 and U.S. Pat. No. 4,859,324. However, although these filter systems solve some of the problems associated with paper membrane filters, they have shortcomings and drawbacks. These prior cross flow filter systems tend to quickly build up a particulate layer on and within the cross flow filter membrane which cannot be easily cleaned by merely back pulsing in a direction opposite the normal flow for filtering. Additionally, a satisfactory means of removing the particulates from the capacity tank is not provided. Further yet, a satisfactory means of causing the particulates in the capacity tank to quickly coagulate and settle is not provided.

SUMMARY OF THE INVENTION

It is the principal object of the present invention to overcome the above-discussed disadvantages associated with prior electrical discharge machine filtering systems. It is a further object of the present invention to provide a new and improved filtering system incorporating a cross flow filter for electrical discharge machines.

The present invention overcomes the disadvantages associated with prior electrical discharge machine filtering systems by providing a filtering apparatus including a plurality of cross flow filters. The cross flow filters are connected in series with a pump which causes machining liquid from a capacity tank to be pumped through each successive cross flow filter and back to the capacity tank. The permeate outlets of the cross flow filters are connected to an electrical discharge machine and provide clean machining liquid thereto. It is also contemplated that the cross flow filters can be connected in parallel to one another rather than in series.

A valve is provided at each cross flow filter permeate outlet and is selectively controlled to open and close. These valves are controlled in response to the volume of liquid in the capacity tank. As the volume increases in the capacity tank indicating an unsatisfied condition at the electrical discharge machine, the permeate valves are successively opened starting with the valve on the cross flow filter permeate outlet furthest downstream of the series of cross flow filters. Because the transmembrane pressure at this cross flow filter is the smallest in the system, the probability of deeply and permanently lodging particulates in the filter membrane is decreased. A back flush or pulse pump is provided in communication with the cross flow filter permeate outlets for providing a back pulse of liquid therethrough on timed intervals. For enhancing the settling of particles in the capacity tank, the capacity tank is provided with an area having a plurality of baffles. The outlet of the cross flow filter backpulse is connected to the capacity tank near the plurality of baffles. In this fashion, when back pulsing for cleaning the filter membranes, particulates which have coagulated with other particulates forming larger particles on the membrane surface tend to be caught by the baffles and are caused to more easily settle to the bottom of the capacity tank.

Particulates which have settled to the bottom of the capacity tank (sludge) are removed therefrom by a surface-type filter and peristaltic pump which draws the sludge from a bottom area of the capacity tank below the baffles. The surface filters are preferably made of paper and two are provided so that one filter may be in line and filtering the machining liquid and sludge from the capacity tank while the other is draining or is being replaced. These paper filters and removed sludge are then properly disposed.

In one form thereof, the present invention is directed to an apparatus for filtering machining liquid of an electrical discharge machine. The apparatus includes a cross flow filter having a machining liquid inlet and outlet and a permeate outlet. The permeate outlet provides clean machining liquid to an electrical discharge machine. A capacity tank is provided receiving the used machining liquid from the electrical discharge machine. The cross flow filter machining liquid inlet and outlet are connected to the capacity tank and to a first pump in a manner whereby machining liquid in the capacity tank is pumped through the cross flow filter and back to the capacity tank. A filter member having an inlet and an outlet is connected to the capacity tank and a second pump is connected in series with the filter member whereby particulates are removed from the capacity tank by the filter member.

In one form thereof, the present invention is directed to an apparatus for filtering machining liquid of an electrical discharge machine. The apparatus includes a capacity tank receiving used machining liquid from an electrical discharge machine. A first pump is provided for pumping machining liquid out of and back into the capacity tank. A plurality of cross flow filters each having a machining liquid inlet and outlet and a permeate outlet are provided. The cross flow filter machining liquid inlets and outlets are connected in series with each other and with the first pump. The permeate outlets provide clean machining liquid to the electrical discharge machine.

In one form thereof, the present invention is directed to an apparatus for filtering machining liquid of an electrical discharge machine. The apparatus includes a cross flow filter having a machining liquid inlet and outlet and a permeate outlet. The permeate outlet provides clean machining liquid to an electrical discharge machine. A capacity tank is provided and receives used machining liquid from the electrical discharge machine. The cross flow filter machining liquid inlet and outlet are connected to the capacity tank and to a first pump whereby machining liquid is pumped out of the capacity tank through the cross flow filter and back to the capacity tank. The capacity tank includes an area having a plurality of baffles.

In one form thereof, the present invention is directed to an apparatus for filtering machining liquid of an electrical discharge machine. The apparatus includes a capacity tank receiving used machining liquid from an electrical discharge machine. A first pump is provided for pumping machining liquid out of and back into the capacity tank. A cross flow filter having a machining liquid inlet and outlet and a permeate outlet is connected in series with the first pump and with the permeate outlet providing the clean machining liquid to the electrical discharge machine. A valve is provided at the cross flow filter permeate outlet and a mechanism is provided for selectively opening and closing the valve in response to the demand of the machining liquid by the electrical discharge machine.

BRIEF DESCRIPTION OF THE DRAWINGS

The above-mentioned and other features and objects of this invention and the manner of obtaining them will become more apparent and the invention itself will be better understood by reference to the following description of embodiments of the invention taken in conjunction with the accompanying drawing wherein.

Corresponding reference characters indicate corresponding parts throughout the several views of the drawings.

Figure 1:
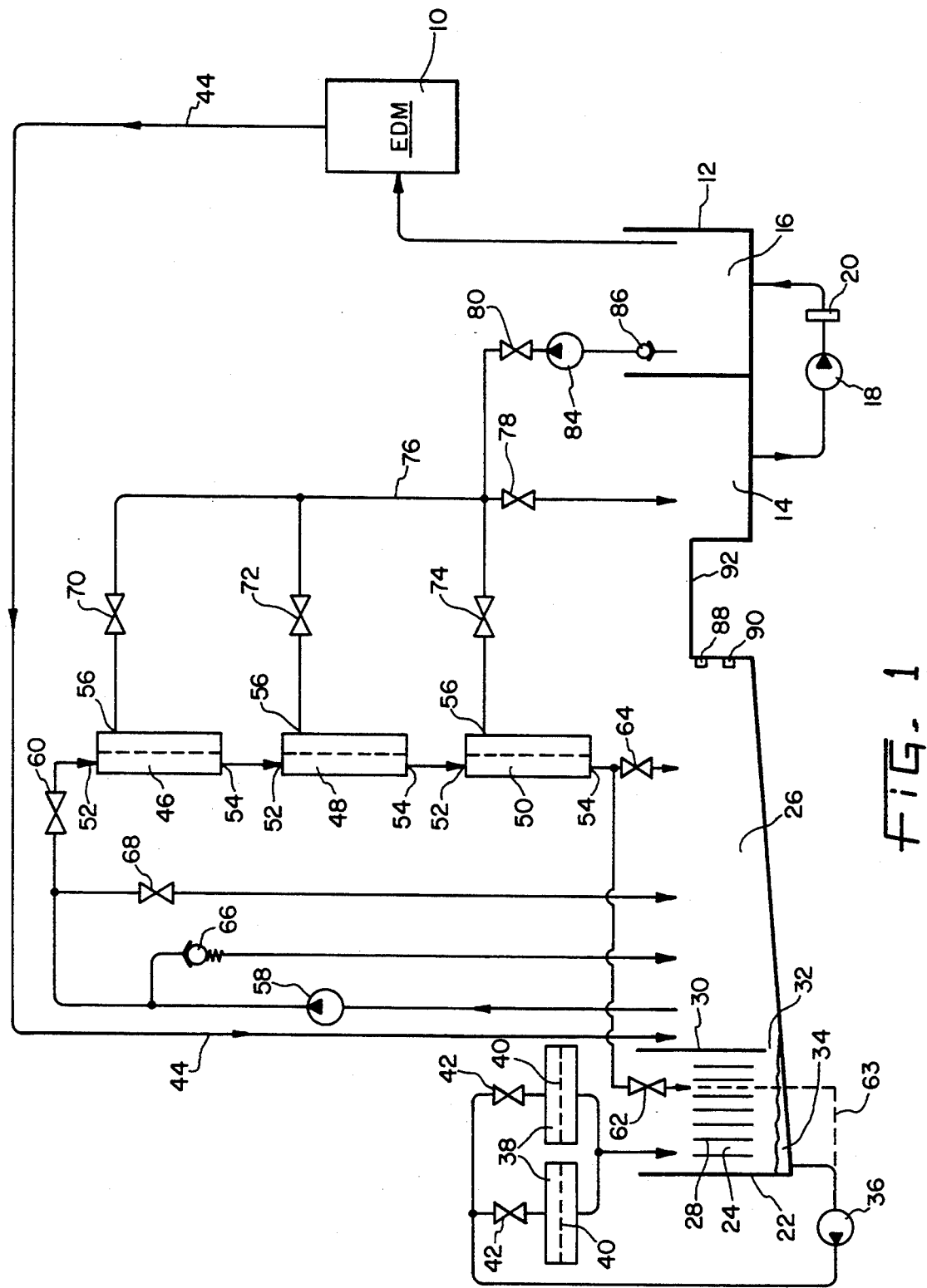
FIG. 1 is a schematic diagram of the apparatus for filtering machining liquid of an electrical discharge machine according to the present invention.

The exemplifications set out herein illustrate preferred embodiments of the invention in one form thereof and such exemplifications are not to be construed as limiting the scope of the disclosure or the scope of the invention in any manner.

DETAILED DESCRIPTION OF THE PREFERRED EMBODIMENTS

Referring now to FIG. 1, an electrical discharge machine is generally indicated by the numeral 10 and is adapted to cut or otherwise shape workpieces via an electroerosion process in a known and customary manner. Electrical discharge machine 10 typically comes equipped with a machining liquid supply tank 12 comprising a dirty container or dirty side 14 and a clean container or side 16. A pump 18 is connected in series with a filter element 20 and is adapted for pumping machining liquid from dirty side 14 through filter 20 and into the clean side 16. In this fashion, filter membrane 20 cleans the machining liquid for reuse by the electrical discharge machine 10. The filtering system, according to the present invention, is intended to be an add on to the filtering accomplished by filter 20 of an electrical discharge machine or, in the alternative, to completely replace filter 20.

The preferred filtering system includes a capacity tank 22 having a baffled area 24 and an open area 26. Baffled area 24 includes a plurality of baffles 28 whereby turbulence of machining liquid within the baffled area 24 is substantially decreased. A separation wall 30 is provided between baffled area 24 and open area 26. However, an opening 32 is provided below separation wall 30 for allowing any sludge that may accumulate at the bottom of open area 26 during periods of disuse to flow into the bottom of baffled area 24.

A peristaltic pump 36 draws sludge and machining liquid from capacity tank 22 and most preferably from the bottom of the capacity tank 22 of the baffled area 24 and below baffles 28. Peristaltic pump 36 pumps the machining liquid and sludge to filter members 38 each having surface-type filter elements 40. Filter members 38 are connected in parallel with one another. Input valves 42 are provided on the inlet side of each filter member 38. Preferably, filter elements 40 are made of paper and have pore sizes in the neighborhood of 50 microns. Filter elements 40 thus trap generally larger particulates or particulates which have coagulated into larger masses. The machining liquid with particulates smaller than the pore sizes of filter elements 40 are discharged back into baffled area 24 of capacity tank 22.

Valves 42 are provided for more easily servicing filter members 38 and for allowing the removal and replacement of one filter element 40 or allowing one filter element to drain while the other one continues to filter the sludge and machining liquid being pumped by peristaltic pump 36. In this fashion, peristaltic pump 36 can be in continuous operation thereby allowing for continuous removal of sludge and particulates from capacity tank 22.

Electrical discharge machine 10 is connected to the filtering system for drawing clean machining liquid from the clean side of supply tank 12. After using the machining liquid in a cutting or shaping operation, the dirty liquid including the workpiece particulates suspended in the machining liquid is dumped into the open area 26 of capacity tank 22 through the electrical discharge machine dirty liquid output line 44. The particulates in the machining liquid within capacity tank 22 start to collide with one another and coagulate forming larger particulates or masses which eventually settle in the baffled area 24 forming sludge 34. Additionally, the more concentrated the machining liquid is within capacity tank 22 the higher the rate of removal of the suspended particulates by filter membrane 38. Given sufficient time, all particulates in capacity tank 22 would settle to the bottom thereof leaving a clean machining liquid thereover. However, a continuous supply of clean machining liquid is required by electrical discharge machine 10 and, therefore, the filtering system provides a means by which clean machining liquid can quickly be separated from the machining liquid within capacity tank 22.

A clean machining liquid is provided to electrical discharge machine 10 through the use of cross flow filters 46, 48 and 50, each having a dirty liquid inlet 52 and outlet 54 and a clean liquid or permeate outlet 56. Cross flow filters 46, 48 and 50 are presently known and used in various industries for micro filtration. The cross flow filters 46, 48, and 50 include a cylindrically-shaped membrane (not shown) having an inlet 52 and an outlet 54. As long as the pressure inside the cylindrical membrane filter is greater than the outside of the cylinder, flow occurs through the filter membrane thereby filtering the liquid flowing through the cylindrical filter membrane and providing a permeate or clean fluid at permeate outlet 56. The quality of filtering depends on the cylindrical membrane pore sizes and the quality of the filter membrane. Additionally, because there is a constant flow of dirty liquid axially through the cylindrical filter membrane, (from inlet 52 to outlet 54) particulates that would normally lodge themselves on the membrane wall and quickly clog the filter membrane, tend to be sheared and carried away thereby increasing the overall quantity of permeate that can be filtered before the membrane pores are so clogged that filtering of permeate essentially stops.

Cross flow filters 46, 48, and 50 are connected in series with one another and with main pump 58 so that, as shown, machining liquid is drawn from open area 26 of capacity tank 22 through pump 58, control valve 60, and through the cross flow filters 46, 48, and 50 and, thereafter, back into the capacity tank through valve 62 or 64 into baffled area 24 or open area 26 respectively. It is also contemplated that the cross flow filters can be connected in parallel (not shown). A one-way high pressure limit valve 66 is provided on the discharge side of pump 58 for allowing fluid flow back into open area 26 of capacity tank 22 in the event that the preselected high pressure limit is reached. Valve 66 is provided primarily for preventing damage from occurring to pump 58.

A bypass valve 68 is also connected on the discharge side of pump 58 and is normally closed. Valve 68 is controlled in conjunction with control valve 60 for allowing the back flushing of cross flow filters 46, 48, and 50 back through permeate outlets 56 as will more fully be described hereinbelow. It is, however, noted that during normal operation control valve 60 remains open and bypass valve 68 remains closed thereby forcing the dirty machining liquid to flow through the cross flow filters. When back flushing, however, control valve 60 is at first closed and bypass valve 68 is opened thereby allowing back flushing at a higher transmembrane pressure while continuously running pump 58 and allowing the discharge from pump 58 to flow back into open area 26 of capacity tank 22 through bypass valve 68. Under normal filtering operation, valve 62 remains closed whereas valve 64 remains open thereby discharging the dirty machining liquid leaving the cross flow filters back into he open area 26 of capacity tank 22. However, during the back flush cycle, valve 62 is opened and valve 64 is closed so that the more concentrated machining liquid created as a result of the back flushing and cleaning of the membrane, is caused to fall into the baffling area 24 whereat settling is enhanced. In the alternative, the outlet of valve 62 can be connected, as indicated by dashed line 63, directly to the inlet of pump 36 leading to surface-type filter members 38. Indeed, it is contemplated that the outlet of valve 62 can be connected to any concentrating or settling device i.e., surface filters, centrifuge, baffles, dryer etc., for capturing the particulates dislodged from the membrane wall.

As indicated hereinabove, the clean machining liquid or permeate exits cross flow filters 46, 48, and 50 at permeate outlets 56. Each of the permeate outlets 56 of cross flow filters 46, 48, and 50 are provided with a valve 70, 72, and 74 respectively. The outlets of these valves are joined to a common permeate line 76 and under normal filtering conditions, valve 78 is open and valve 80 is closed thus placing the permeate within container 14 of supply tank 12. Valve 78 is open to the atmosphere and, therefore, whenever any one of permeate valves 70, 72, or 74 are opened, the pressure across the cross flow filter membrane is equal to the difference between the pressure within the cylindrical filter membrane (the dirty liquid loop pressure) and atmosphere.

It is further noted that because cross filters 46, 48, and 50 are in series with one another, the pressure within cross flow filter 46 is greater than the pressure within cross flow filter 48 which, in turn, is greater than the pressure within cross flow filter 50. In the preferred embodiment, there is a pressure drop of nine pounds per square inch through each cross flow filter and pump 58 delivers a maximum of thirty pounds per square inch of pressure. Thus, at the inlet 52 of cross flow filter 46, the gauge pressure is thirty pounds per square inch; the pressure at inlet 52 of cross flow filter 48 is twenty-one pounds per square inch; the pressure at the inlet 52 of cross flow 50 is twelve pounds per square inch; and, the pressure at the outlet 54 of cross flow filter 50 is three pounds per square inch.

A back flush pump 84 is provided and is adapted for drawing clean machining liquid from container 16 through one-way valve 86. Accordingly, for back flushing, valve 60 is first closed and valve 68 is opened on the inlet side of cross flow filters 46, 48, and 50 and valve 64 is closed and valve 62 is opened on the outlet side of the cross flow filters. Because valve 62 is open to atmosphere, the dirty or inner side of the cross flow filters is essentially also at atmospheric pressure or zero pounds per square inch gauge pressure with respect to pump 84. Thereafter, valve 78 is closed, valve 80 is opened and pump 84 is activated forcing clean machining liquid up through one-way valve 86 and into permeate line 76. Permeate valves 70, 72, and 74 are then successively selectively opened allowing back pulses or back flushing to occur at each cross flow filter element 46, 48, and 50. It is noted that each cross flow filter is back flushed successively so as to maximize the back pressure experienced through its filter membrane. Preferably, pump 84 is capable of producing sixty pounds per square inch of pressure at the required flush flow rate and, therefore, each of the filter membranes of the cross flow filters are successively exposed to a back flush pressure of sixty pounds per square inch. A timer or microprocessor control mechanism is provided for controlling the back flushing cycle as well as the selective opening and closing of the various valves as described herein. It has been found that in the present filtering system, it is most efficient to back flush on timed intervals and, most preferably, to back flush each of the cross flow filters as described hereinabove at intervals between 5 and 15 minutes.

It should further be noted that at the conclusion of each back flushing cycle or interval, valve 68 is closed and valve 60 is opened prior to closing valve 62 and re-opening valve 64. In this fashion, particulates that are dislodged from the cross flow filter membranes by the back flushing are dumped into the baffled area 24 of capacity tank 22. Thereafter, after a short period of time, valve 62 is again closed and valve 64 is opened thereby again dumping the dirty machining liquid into the open area 26 of capacity tank 22. During those final periods, each membrane may again be back flushed so increasing momentarily the cross flow velocity and hence the shear forces. More specifically, after the initial back flushing and opening of valve 60, either prior to or after closing valve 62, additional back flushing can be provided by retaining pump 84 on and selectively opening valves 70, 72, and 74. In this fashion, the back flushing flow as well as the normal flow through the cross flow filters caused by pump 58 work together to further dislodge any particulates on the cross flow filter membrane walls.

Permeate valves 70, 72, and 74 are selectively opened and closed in response to the demand for machining liquid by electrical discharge machine 10. In this regard, a high level sensor 88 and a low level sensor 90 are provided on capacity tank 22. Whenever a high level is sensed by sensor 88 thereby indicating a demand condition for machining liquid in the electrical discharge machine 10, permeate valve 74 is first opened and leaving valves 72 and 70 closed. Permeate valve 74 is opened prior to valves 70 and 72 because the pressure across the cross flow filter membrane 50, as described hereinabove, is less than that of cross flow filters 46 and 48. Accordingly, the potential for jamming particulates deep within the cross flow filter membrane is decreased and the probability of dislodging substantially all particulates building up on the membrane wall during the back flushing is substantially increased. Depending on demand of machining liquid and/or time, the control mechanism or microprocessor (not shown) causes valves 72 and 70 to also open for creating additional permeate as needed. This continues Until sensor 90 senses a low level in capacity tank 22 indicating that most of the machining liquid in the system is clean and is in supply tank 12 and, in response thereto, all of permeate valves 70, 72, and 74 are closed thereby conserving the effectiveness of cross flow filters 46, 48, and 50. As can now be seen, permeate valves 70, 72, and 74 are opened in response to an increase in volume in capacity tank 22 and are closed in response to a decrease in volume in capacity tank 22.

Although back flushing temporarily cleans the cross flow filter membranes and allows for additional filtering, after substantial use, particulates become permanently lodged within the pores of the cross flow filter membranes and the effectiveness thereof is diminished. At that point, the cross flow filters are removed and exposed to an acid and/or alkali for thoroughly cleaning and removing all particulates from within the cross flow membrane pores. Alternatively, cross flow filters 46, 48, and 50 can be valved (not shown) in a manner whereby acid and/or alkali can be pumped therethrough for cleaning in this manner. It is contemplated that acid cleaning will be needed every 3 to 6 months with most electrical discharge machines.

Preferably, cross flow filters 46, 48, and 50 are made of carbon and include carbon cylindrical membranes. The carbon filter membrane thickness is 0.1 to 1 micron with the pores thereof being 0.1 to 3 microns in diameter. Carbon filters of this character are presently available from Le Carbone Lorraine of Paris, France.

An overflow connection 92 is also provided between supply tank 12 and capacity tank 22 so that, in the event of a control failure where there is an over production of permeate, the permeate within supply tank 12 will merely overflow back into capacity tank 22. Also, if the demand of the EDM machine exceeds the capacity of the filtering apparatus, the excess will overflow from tank 22 to tank 12.

As should now be evident, all particulates in the filtering system remain trapped in the capacity tank 22 and are removed therefrom only by filter members 38. Clean machining liquid or permeate is removed from capacity tank 22 only upon demand by the electrical discharge machine and, after use, is recirculated back into the capacity tank 22. The overall useful life of the system membranes is increased through the utilization of cross flow filters which are placed in series and selectively drawing permeate therefrom only on demand successively initially from the cross flow filter having the smallest transmembrane pressure.

While the invention has been described as having specific embodiments, it will be understood that it is capable of further modifications. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus for filtering machining liquid of an electrical discharge machine comprising:
   a cross flow filter having a machining liquid inlet and outlet and a permeate outlet, said permeate outlet providing clean machining liquid to an electrical discharge machine;
   a capacity tank receiving used machining liquid from the electrical discharge machine;
   said cross flow filter machining liquid inlet and outlet connected to said capacity tank and to a first pump, whereby machining liquid is pumped from the capacity tank through the cross flow filter and back to the capacity tank;
   a filter member having an inlet and an outlet connected to said capacity tank; and,
   a second pump connected in series with said filter member, whereby particulates are removed from said capacity tank by said filter member.

2. The filtering apparatus of claim 1 wherein said filter member includes filter member pores and said cross flow filter includes cross flow pores, said filter member pores being larger than said cross flow pores.

3. The filtering apparatus of claim 2 wherein said filter member inlet is connected to a bottom area of said capacity tank and said second pump is a peristaltic pump.

4. The filtering apparatus of claim 3 wherein said bottom area of said capacity tank is below a plurality of baffles located in said capacity tank.

5. The filtering apparatus of claim 2 wherein said filter member comprises two filter elements each selectively placed in line with said second pump, whereby one filter element can be replaced with the other continuing to filter machining liquid from said capacity tank.

6. The filtering apparatus of claim 1 wherein said filter member inlet is connected to a bottom area of said capacity tank and said second pump is a peristaltic pump.

7. The filtering apparatus of claim 6 wherein said bottom area of said capacity tank is below a plurality of baffles located in said capacity tank.

8. The filtering apparatus of claim 1 comprising a plurality of cross flow filters having machining liquid inlets and outlets, each of said cross flow filters connected in series with each other and said first pump and having permeate outlets providing clean machining liquid to the electrical discharge machine.

9. The filtering apparatus of claim 8 further comprising a valve at each cross flow filter permeate outlet, each of said valves being selectively opened and closed.

10. The filtering apparatus of claim 9 further comprising a control mechanism controlling said valves in response to the volume of liquid in said capacity tank.

11. The filtering apparatus of claim 10 wherein said control mechanism controlling said valves to selectively open in response to an increase in liquid volume in said capacity tank.

12. The filtering apparatus of claim 1 wherein said filter member includes a membrane filter element.

13. The filtering apparatus of claim 1 wherein said capacity tank includes an area having a plurality of baffles.

14. The filtering apparatus of claim 13 wherein said filter member inlet is connected to a bottom area of said capacity tank below said baffles.

15. The filtering apparatus of claim 1 further comprising means for providing a back pulse of liquid back through said cross flow filter permeate outlet, said back pulse being provided on timed intervals.

16. The filtering apparatus of claim 1 comprising a valve at said cross flow filter permeate outlet, said valve being selectively opened and closed in response to the demand for machining liquid by the electrical discharge machine.

17. An apparatus for filtering machining liquid of an electrical discharge machine comprising:
a capacity tank receiving used machining liquid from an electrical discharge machine;
a first pump for pumping machining liquid out of and back into said capacity tank;
a plurality of cross flow filters each having a machining liquid inlet and outlet and a permeate outlet, said cross flow filters machining liquid inlets and outlets connected in series with each other and said first pump, said permeate outlets providing clean machining liquid to said electrical discharge machine; and,
a valve at each cross flow filter permeate outlet, each of said valves being selectively opened and closed.

18. The filtering apparatus of claim 17 wherein said cross flow filters are made of carbon having a filter layer with a thickness of less than 5 microns and pore diameters smaller than 3 microns.

19. The filtering apparatus of claim 17 further comprising means for providing a back pulse of liquid back through said cross flow filter permeate outlets, said back pulse being provided on timed intervals.

20. The filtering apparatus of claim 17 further comprising a control mechanism and wherein said valves are controlled by said control mechanism in response to the volume of liquid in said capacity tank.

21. The filtering apparatus of claim 20 wherein said control mechanism controls said valves to selectively open in response to an increase in liquid volume in said capacity tank.

22. The filtering apparatus of claim 21 wherein said control mechanism successively opens said valves starting with the valve on the cross flow filter furthest downstream from all other cross flow filters.

23. The filtering apparatus of claim 17 further comprising a control mechanism successively opening said valves starting with the valve on the cross flow filter furthest downstream from all other cross flow filters.

24. An apparatus for filtering machining liquid of an electrical discharge machine comprising:
a cross flow filter having a machining liquid inlet and outlet and a permeate outlet, said permeate outlet providing clean machining liquid to an electrical discharge machine;
a capacity tank receiving used machining liquid from the electrical discharge machine;
said cross flow filter machining liquid inlet and outlet connected to said capacity tank and to a first pump whereby machining liquid is pumped from said capacity tank through said cross flow filter and back to said capacity tank; and,
wherein said capacity tank includes an area having a plurality of baffles and said cross flow filter outlet is connected to said capacity tank near said plurality of baffles.

25. The filtering apparatus of claim 24 further comprising means for providing a back pulse of liquid back through said cross flow filter permeate outlet, said back pulse being provided on timed intervals.

26. An apparatus for filtering machining liquid of an electrical discharge machine comprising:
a capacity tank receiving used machining liquid from an electrical discharge machine;
a first pump for pumping machining liquid out of and back into said capacity tank;
a cross flow filter having a machining liquid inlet and outlet and a permeate outlet, said cross flow filter machining liquid inlet and outlet connected in series with said first pump, and said permeate outlet providing clean machining liquid to said electrical discharge machine;
a valve at said cross flow filter permeate outlet; and,
means for selectively opening and closing said valve in response to the demand of machining liquid by the electrical discharge machine.

27. The filtering apparatus of claim 26 wherein said means for selectively opening and closing includes a means for sensing the volume of liquid in said capacity tank and wherein said valve is selectively opened in response to an increase in liquid volume in said capacity tank.

28. An apparatus for filtering machining liquid of an electrical discharge machine comprising:
a capacity tank receiving used machining liquid from an electrical discharge machine;
a first pump for pumping machining liquid out of and back into said capacity tank;
a cross flow filter having a machining liquid inlet and outlet and a permeate outlet, said cross flow filter machining liquid inlet and outlet connected in series with said first pump, and said permeate outlet providing clean machining liquid to said electrical discharge machine;
means for providing a back pulse of liquid back through said cross flow filter permeate outlets and for dislodging particulates within said cross flow filter; and, means for selectively directing said particulates dislodged during back flushing out through said cross flow filter outlet and to a concentrating device after back flushing said cross flow filter.

29. The filtering apparatus of claim 28 wherein said concentrating device includes a tank having a plurality of baffles therein.

30. The filtering apparatus of claim 28 wherein said concentrating device includes a surface filter.

* * * * *

UNITED STATES PATENT AND TRADEMARK OFFICE
CERTIFICATE OF CORRECTION

PATENT NO. : 5,434,381

DATED : July 18, 1995

INVENTOR(S) : George R. Mitcheson

It is certified that error appears in the above-identified patent and that said Letters Patent is hereby corrected as shown below:

Col. 5, line 57, change "he" to --the--.

Col. 7, line 37, change "Until" to --until--.

Claim 11, line 17, change "controlling" to --controls--.

Signed and Sealed this

Seventeenth Day of October, 1995

Attest:

BRUCE LEHMAN

*Attesting Officer*         *Commissioner of Patents and Trademarks*